United States Patent
Derks et al.

(10) Patent No.: US 11,961,314 B2
(45) Date of Patent: Apr. 16, 2024

(54) METHOD FOR ANALYZING AN OUTPUT OF AN OBJECT DETECTOR

(71) Applicant: NXP B.V., Eindhoven (NL)

(72) Inventors: Gerardus Antonius Franciscus Derks, Dongen (NL); Wilhelmus Petrus Adrianus Johannus Michiels, Reusel (NL); Brian Ermans, 's-Hertogenbosch (NL); Frederik Dirk Schalij, Eindhoven (NL)

(73) Assignee: NXP B.V., Eindhoven (NL)

( * ) Notice: Subject to any disclaimer, the term of this patent is extended or adjusted under 35 U.S.C. 154(b) by 576 days.

(21) Appl. No.: 17/176,583

(22) Filed: Feb. 16, 2021

(65) Prior Publication Data

US 2022/0261571 A1 Aug. 18, 2022

(51) Int. Cl.
| | |
|---|---|
| *G06V 10/20* | (2022.01) |
| *G06F 18/213* | (2023.01) |
| *G06N 5/04* | (2023.01) |
| *G06N 20/00* | (2019.01) |
| *G06V 20/64* | (2022.01) |

(52) U.S. Cl.
CPC ............ *G06V 20/64* (2022.01); *G06F 18/213* (2023.01); *G06N 5/04* (2013.01); *G06N 20/00* (2019.01); *G06V 10/255* (2022.01)

(58) Field of Classification Search
CPC .............................. G06V 10/764; G06V 10/82
See application file for complete search history.

(56) References Cited

U.S. PATENT DOCUMENTS

| | | |
|---|---|---|
| 10,402,692 B1 | 9/2019 | Kim et al. |
| 10,581,887 B1 | 3/2020 | Dinerstein |
| 2012/0148093 A1* | 6/2012 | Sharma ................... G06T 7/251 |
| | | 382/106 |
| 2017/0169314 A1* | 6/2017 | Dijkman .............. G06F 18/2163 |
| 2018/0285682 A1* | 10/2018 | Najibi ..................... G06T 7/194 |
| 2019/0057507 A1* | 2/2019 | El-Khamy .............. G06T 11/60 |
| 2019/0073553 A1* | 3/2019 | Yao ........................ G06F 18/214 |
| 2019/0325243 A1* | 10/2019 | Sikka ................... G06V 10/267 |
| 2020/0194108 A1* | 6/2020 | Podilchuk .............. G16H 30/40 |

(Continued)

OTHER PUBLICATIONS

Ananth, Shilpa; "Faster R-CNN for Object Detection;" Towards Data Science; Aug. 9, 2019; Retrieved from the Internet: https://towardsdatascience.com/faster-r-cnn-for-object-detection-a-technical-summary-474c5b857b46.

(Continued)

*Primary Examiner* — Guillermo M Rivera-Martinez
(74) *Attorney, Agent, or Firm* — Daniel D. Hill (57) ABSTRACT

A method is described for analyzing an output of an object detector for a selected object of interest in an image. The object of interest in a first image is selected. A user of the object detector draws a bounding box around the object of interest. A first inference operation is run on the first image using the object detector, and in response, the object detect provides a plurality of proposals. A non-max suppression (NMS) algorithm is run on the plurality of proposals, including the proposal having the object of interest. A classifier and bounding box regressor are run on each proposal of the plurality of proposals and results are outputted. The outputted results are then analyzed. The method can provide insight into why an object detector returns the results that it does.

20 Claims, 5 Drawing Sheets

(56) References Cited

U.S. PATENT DOCUMENTS

2021/0019544 A1* 1/2021 Park ..................... G06V 10/764

OTHER PUBLICATIONS

Brownlee, Jason; "Best Practices for Preparing and Augmenting Image Data for CNNs;" Machine Learning Mastery, Making Developers Awesome at Machine Learning; May 3, 2019, Last Updated Jul. 5, 2019; in Deep Learning for Computer Vision; https://machinelearningmastery.com/best-practices-for-preparing-and-augmenting-image-data-for-convolutional-neural-networks/.

Gao, Mingfei et al.; "Dynamic Zoom-in Network for Fast Object Detection in Large Images;" arXiv:1711.05187; Submitted Nov. 13, 2017, Last Revised Mar. 27, 2018.

Hoiem, Derek et al.; "Diagnosing Error in Object Detectors;" Proceedings of the 12th European Conference on Computer Vision; Oct. 2012; DOI: 10.1007/978-3-642-33712-3_25.

Howard, Andrew G. "Some Improvements on Deep Convolutional Neural Network Based Image Classification;" arXiv:1312.5402; Submitted Dec. 19, 2013.

Krizhevsky, Alex et al.; "ImageNet Classification with Deep Convolutional Neural Networks;" Advances in Neural Information Processing Systems; Jan. 2012; DOI: 10.1145/3065386.

Lu, Yongxi et al.; "Adaptive Object Detection Using Adjacency and Zoom Prediction;" arXiv:1512.07711; Submitted Dec. 24, 2015, Last Revised Apr. 11, 2016.

Redmon, J. et al. "You Only Look Once: Unified, Real-Time Object Detection:" 2016 IEEE Conference on Computer Vision and Pattern Recognition (CVPR), Las Vegas, Nevada; doi: 10.1109/CVPR.2016.91.

Ren, S. et al. "Faster R-CNN: Towards Real-Time Object Detection with Region Proposal Networks," in IEEE Transactions on Pattern Analysis and Machine Intelligence, vol. 39, No. 6, pp. 1137-1149, Jun. 1, 2017, doi: 10.1109/TPAMI.2016.2577031.

Rey, Javier Blog; Tyro Labs; Faster R-CNN: Down the Rabbit Hole of Modern Object Detection; Jan. 18, 2018; https://tryolabs.com/blog/authors/javier-rey/.

Selvaraju, Ramprasaath R., et al. "Grad-CAM: Visual Explanations from Deep Networks via Gradient-Based Localization;" arXiv:1610.02391; Submitted Oct. 7, 2016, Last Revised Dec. 3, 2019.

Su, Hao et al.; "Crowdsourcing Annotations for Visual Object Detection;" AAAI Publications, Workshops at the Twenty-Sixth AAAI Conference on Artificial Intelligence; 2012.

* cited by examiner

METHOD FOR ANALYZING AN OUTPUT OF AN OBJECT DETECTOR

BACKGROUND

Field

This disclosure relates generally to machine learning, and more particularly, to a method of analyzing an output of an objection detector.

Related Art

Image classification can be used in many applications, such as for example, medical and automotive applications. An image classification system may use a machine learning (ML) system to, for example, classify images into various categories based on a ML model trained on a dataset of images. In some applications, it may be useful to classify multiple objects within individual images. Object detection includes drawing bounding boxes around one or more objects in an image, such as a digital photo, and identifying the objects within the bounding boxes. Object detectors are complex machine learning systems that require many processing steps. Many machine learning models used in object detectors may be considered "black-boxes," where little information is known about the inner workings of the ML models that are part of the object detectors. In particular, if an object detector makes an error, it is difficult to pinpoint the step(s) in the system that is/are at fault. If an object remains undetected, various components of the object detector may be the culprit. An object detector may include a Region Proposal Network (RPN) and/or a Non-Max suppression (NMS). One issue may be that the object is badly covered by the regions proposed by the RPN. The object may also be detected as the 'background' class. Yet another reason for a detection failure may be that the region of the image having the object gets suppressed by the NMS. Also, it may not be evident from the output of an object detector why an object is not detected.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for analyzing an output of an object detector. In one embodiment, an object in an image is selected for analysis. The particular object may be selected because the object was misidentified by the object detector or because the object detector otherwise made an error regarding an object. In the method, a user interface allows a ML designer to draw a custom bounding box on the image around the selected object to be analyzed. An inference operation is then run on the image having the custom bounding box with the object detector. The object detector will generate one or more "proposals." In one embodiment, a proposal of interest with the highest intersection over union (IoU) with the custom user drawn bounding box is identified. The IoU is a measure of the amount of overlap between two bounding boxes. The location of this proposal of interest is provided as well as confidences for foreground and background classes of the proposals of interest. The object detector will typically reduce the number of proposals using NMS to the proposals with the highest foreground confidences. The remaining proposals are discarded. However, in one embodiment, the proposal of interest comprising the custom bounding box is prevented from being discarded. Exempting the proposal of interest from being discarded serves as a tool for learning about the behavior of the system with respect to the proposal of interest. The remaining proposals after NMS become known as "detections" and are output by the object detector. The outputted detections include confidences and bounding boxes that are a result of running a classifier and bounding box regressor on the remaining proposals. One question that may be answered by the method is whether the proposal would still be one of the output detections if one intermediate step in the system had not discarded it.

In another embodiment, the custom bounding box may be constructed in various ways. For example, a margin having a chosen width may be included around the object. The margin provides additional contextual image data. The bounding box is then isolated from the image. In one embodiment, the bounding box is cropped from the image. Alternatively, the bounding box is not cropped, but the area of the image outside of the bounding box is masked with, for example, a solid color, so that the original image is run by the object detector with much of the image masked. Also, multiple images may be created of the bounded object of interest with margins having different dimensions. An inference operation is then run on each of the multiple cropped or masked images with the object detector.

The disclosed method provides a tool for aiding a ML designer in determining why an object detector has trouble recognizing a specific object in an image. A good understanding of the internal mechanisms of a ML model in the object detector enables model designers to learn about the behavior of the object detector and to enhance trust in the object detector. Also, uncovering the concealed mechanisms for a specific object or location in an image enables model designers to debug the model and potentially improve the model without having to retrain the ML model.

In accordance with an embodiment, there is provided, a method for analyzing an output of an object detector for a selected object of interest in an image, the method including: selecting the object of interest in a first image; drawing, by a user of the object detector, a bounding box around the object of interest; running a first inference operation on the first image using the object detector, wherein the object detector generates a plurality of proposals; determining which of the plurality of proposals is most like the bounding box around the object of interest; running a non-max suppression (NMS) algorithm on the plurality of proposals, wherein the plurality of proposals includes the object of interest; running a classifier and bounding box regressor on each proposal of the plurality of proposals and outputting the results; and analyzing the outputted results of the object detector. The object detector may include a convolutional neural network having a plurality of layers, wherein the method may further include: changing a margin of the bounding box; running a second inference operation after changing the margin of the bounding box; outputting results from an intermediate layer of the plurality of layers; and comparing differences between the outputted results of the first inference operation and an outputted result after the second inference operation. Drawing a bounding box around the object of interest may further include: drawing the bounding box having a configurable margin, wherein the bounding box is larger than the object; masking all an area outside of the bounding box in the first image to create a second image; running a second inference operation on the second image; and analyzing outputted results from the second inference operation. Drawing a bounding box around the object of interest may further include: drawing the bounding box around the object of interest having a configurable margin; cropping the bounding box with the configurable margin from the first image to create a second image; running a second inference operation on the second image; and analyzing outputted results from the first and second inference operations. The method may further include: drawing a plurality of bounding boxes around the object of interest, each bounding box of the plurality of bounding boxes having a different sized margin; cropping each bounding box comprising the object of interest with the different sized margins to create multiple bounding boxes; running an additional inference operation for each bounding box of the plurality of bounding boxes to generate one or more detections; computing an intersection over union (IoU) for each of the one or more detections; recording an output class confidence for the one or more detections; and using the recorded output class confidences to derive a confidence metric for the object of interest. Drawing the bounding box having a configurable margin may further include drawing a plurality of bounding boxes around the object of interest, each bounding box of the plurality of bounding boxes may have a different sized margin, wherein the margins for the plurality of bounding boxes may be equal to $0.2 \times 2^n$ where n is an integer. Analyzing the outputted results from the additional inference operations may further include: aggregating the outputted results; and determining how many times the object of interest was correctly identified. The object detector may include one of either a one-stage object detector or a two-stage object detector. The method may further include preventing the NMS algorithm from discarding a proposal of the plurality of proposals that includes the object of interest.

In another embodiment, there is provided, a method for analyzing an output of an object detector for a selected object of interest in an image, the method comprising: selecting the object of interest in a first image; adding the bounded object to a plurality of proposals; running a first inference operation on the first image; running a non-max suppression (NMS) algorithm on the plurality of proposals, wherein the plurality of proposals includes the bounded object; preventing the NMS algorithm from discarding a proposal of the plurality of proposals that includes the object of interest; running a classifier and bounding box regressor on each proposal of the plurality of proposals and outputting the results; and analyzing the outputted results of the object detector. The object detector may include a convolutional neural network having a plurality of layers, wherein the method may further include: changing a margin of the bounding box; running a second inference operation after changing a margin of the bounding box; outputting results from an intermediate layer of the; and comparing differences between the outputted results of the first inference operation and an outputted result after the second inference operation. Drawing a bounding box around the object of interest may further include: drawing the bounding box having a configurable margin, wherein the bounding box is larger than the object; masking all an area outside of the bounding box in the first image to create a second image; running a second inference operation on the second image; and analyzing outputted results from the second inference operation. Drawing a bounding box around the object of interest may further include: drawing the bounding box having a configurable margin, wherein the bounding box is larger than the object; cropping the bounding box from the first image to create a second image; running a second inference operation on the second image; and analyzing outputted results from the second inference operation. The method may further include: drawing a plurality of bounding boxes around the object of interest, each bounding box of the plurality of bounding boxes having a different sized margin; cropping each bounding box with the different sized margins; running an additional inference operation for each cropped bounding box of the plurality of bounding boxes to generate one or more detections; and computing an intersection over union (IoU) for each of the one or more detections; recording an output class confidence for the one or more detections; and using the recorded output class confidences to derive a confidence metric for the object of interest. Drawing the bounding box having a configurable margin may further include drawing a plurality of bounding boxes around the object of interest, each bounding box of the plurality of bounding boxes may have a different sized margin, wherein the margins for the plurality of bounding boxes may be equal to $0.2 \times 2^n$ where n is an integers. analyzing the outputted results from the additional inference operations may further include: aggregating the outputted results; and determining how many times the object of interest was correctly identified. The object detector may comprise one of either a one-stage object detector or a two-stage object detector.

In yet another embodiment, there is provided, a method for analyzing an output of an object detector for a selected object of interest in an image, the method including: selecting the object of interest in a first image; drawing, by the user, a plurality of bounding boxes around the object of interest, each bounding box of the plurality of bounding boxes having a different sized margin; isolating each bounding box with the different sized margins from the rest of the image; running an inference operation for each isolated bounding box of the plurality of bounding boxes, wherein the object detector provides a plurality of proposals for each inference operation; running a non-max suppression (NMS) algorithm on the plurality of proposals; running a classifier and bounding box regressor on each proposal of the plurality of proposals and outputting the results; and analyzing the outputted results of the object detector. The margins for the plurality of bounding boxes may be equal to $0.2 \times 2^n$ where n is an integer. Isolating each bounding box with the different sized margins from the rest of the image may further include either cropping each bounding box from the image or masking all of an area outside of the bounding box.

The concept of interpretability in machine learning helps provide insights into the internal mechanisms of a machine learning model. The ability to explain and reason about the prediction behavior of an ML system is important for various reasons. Interpretability methods are tools for increasing that ability. In the development or creation phase of an ML system, interpretability methods help in discovering problems with the system itself and the data the system was trained on. Once problems are discovered, interpretability methods can also indicate what approach can be taken to resolve the problems. For example, in the ML application domain of autonomous driving, these problems may compromise passenger safety. In other ML domains, the presence of a problem called "bias" may skew the results. Interpretability methods can also confirm the behavior of the ML system is based on the appropriate attributes and thereby increase trust in the system. Interpretability methods also serve as tools for root cause analysis in the case where a problem occurs in an ML system in the field.

The disclosed method provides an interpretability method for object detectors. For example, object detectors may have trouble recognizing small objects in an image as a lot of detail is lost in the convolutional layers and the pooling layers of a neural network. The disclosed method helps to provide understanding of the mechanisms in the ML system that cause the ML system to fail on small objects. One example of a dataset for object detection is the Microsoft Common Objects In Context (MS COCO) dataset.

Figure 1:
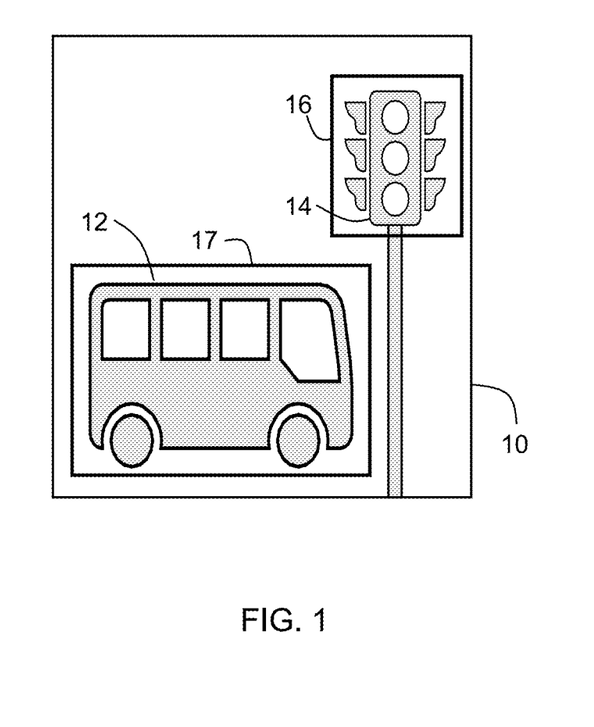
FIG. 1 illustrates an image with bounding boxes drawn around objects.

FIG. 1 illustrates image 10. Image 10 may be any type of image on which it is desired to run an object detector, such as for example, a photograph. Typically, an image includes one or more objects. As an example, image 10 includes a vehicle 12 and a traffic light 14. In the example, vehicle 12 may be a bus. An object detector includes an ML model that will provide bounded areas or regions in the image with bounding boxes called proposals. As an example, traffic light 14 is bounded with a bounding box 16 and bus 12 is bounded with bounding box 17. If desired, in another embodiment, vehicle 12 may be divided into multiple objects. For example, the windows, door, and wheels of bus 12 may be separate objects, each with its own bounding box. The object detector is trained and used to locate and identify objects in the image. There are several common mistakes made by object detectors. For example, the object detector will misidentify an object, identify a "phantom" object, i.e., mistakenly identify a non-existent object, or completely miss the existence of an object in the image.

Figure 2:
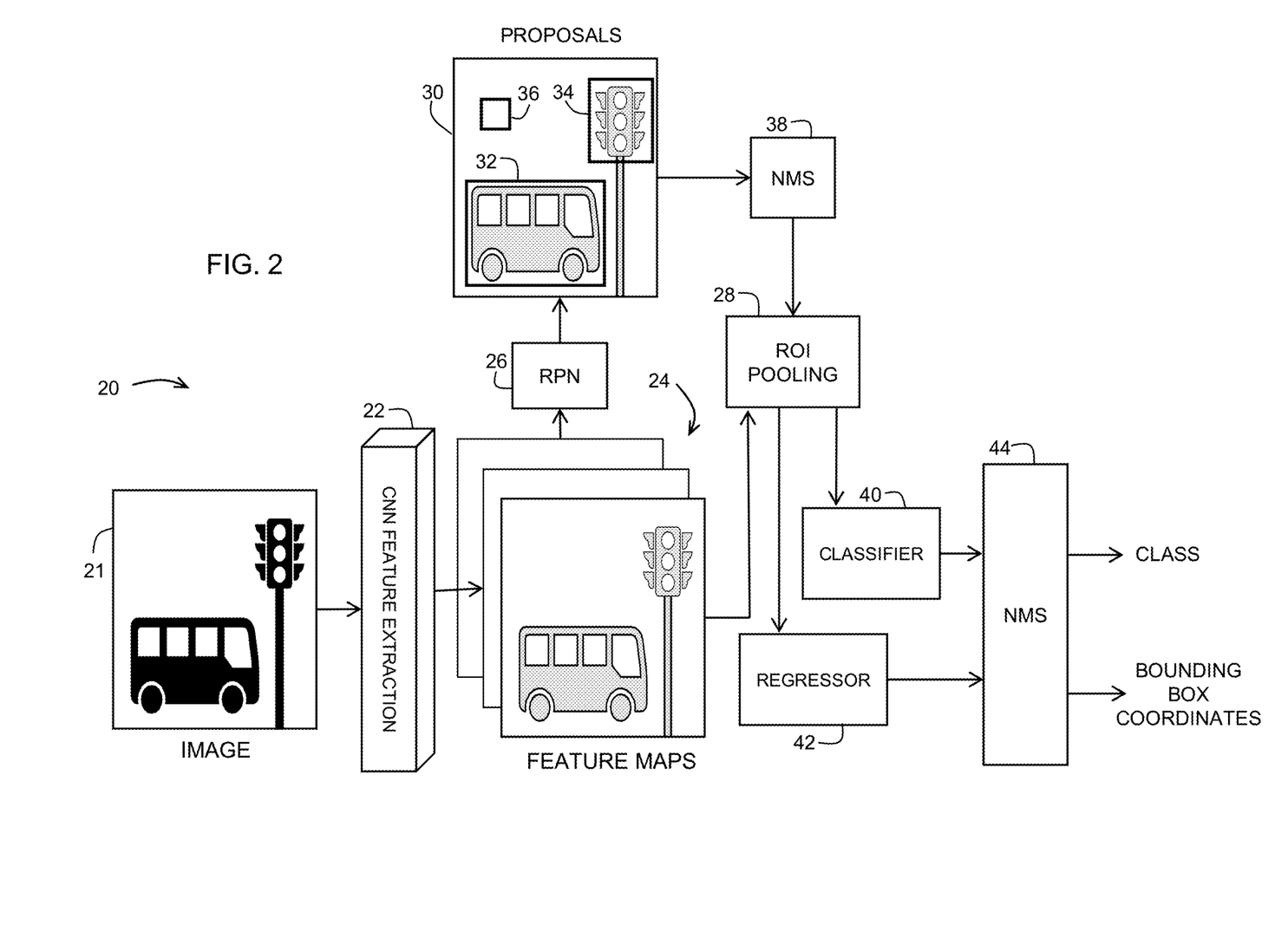
FIG. 2 illustrates an object detector in accordance with an embodiment.

FIG. 2 illustrates object detector 20 in accordance with an embodiment. Object detector 20 includes a convolutional neural network (CNN) feature extraction block 22, region proposal network (RPN) 26, region of interest (ROI) pooling block 28, classifier block 40, bounding box regressor block 42, and non-max suppression (NMS) blocks 38 and 44. Object detector 20 may be any type of object detector. In one embodiment, object detector 20 is a Faster R-CNN object detector. Some object detectors do not use a RPN, but use other conventional image processing techniques. In another embodiment, object detector 20 may be another type of detector such as a one-stage object detector. One example of a one-stage object detector is the YOLO (You only look once) object detector. The YOLO object detector differs from the object detector illustrated in FIG. 2 in that a YOLO object detector typically does not have a separate region proposal mechanism but instead does both classification and bounding box regression in parallel.

By way of example, assume object detector 20 is trained to detect objects in a traffic scene and failed to properly identify a traffic light present in image 21. In an inference operation according to an embodiment, image 21 is selected for analysis. In one embodiment, the method may be implemented in software on a data processing system. The method allows a user, such as a ML model designer, to draw a bounding box on an image surrounding an object of interest and to run object detector 20 with the user drawn bounding box. Drawing a bounding box around a selected object may include selecting a bounding box from bounding boxes generated by RPN 26. In FIG. 2, image 21 is input to object detector 20 and passed through convolutional layers of CNN feature extraction block 22 to extract feature maps 24. Feature maps 24 are used for predicting proposals, such as proposals 32, 34, and 36. In an example using the Faster R-CNN object detector, the feature maps are provided as inputs to RPN 26. Region proposal network 26 predicts a number of possible locations for objects in image 21. An output 30 from RPN 26 is an intermediate output that includes the proposals generated by RPN 26. Each proposal includes a bounding box surrounding an object in the image. For example, bounding box 32 surrounds the bus and user drawn bounding box 34 surrounds a traffic light. Bounding box 36 surrounds a proposal for a phantom object. A phantom object refers to a proposal for an object that does not actually exist in the image.

Region proposal network 26 provides bounding box coordinates for the location of proposals for objects as well as confidences for whether the bounding boxes contain an object in the foreground or background of the image. A simplified output 30 from RPN 26 is shown in output 30. In accordance with the described method, a user drawn bounding box, such as bounding box 34 around the traffic light, is included with the proposals. The user drawn bounding box may be drawn in various ways. For example, in one embodiment, the user drawn bounding box may be drawn by the user clicking the top left and bottom right corners of a desired box. Alternately, a proposed region or predicted bounding box provided by the object detector may be selected by the user. The selected bounding box may also be a predicted bounding box having the highest intersection over union (IoU) around an object of interest. Yet another way is that the bounding box originates from a test dataset or another dataset with a ground truth. The object detector will show the user the location of the proposal, either visually or textually, as well as the confidences for the foreground and background. In another embodiment, the user selected bounding box may be substituted for another predicted bounding box. Also, in another embodiment, the bounding box may be drawn another way. The user drawn bounding box is then appended to the output of RPN 26 of the region proposals.

Feature maps 24 are provided to ROI pooling 28. NMS block 38 receives the outputted proposals. Non-Max suppression 38 is used to filter the proposals to reduce overlap. During NMS, the number of proposals is reduced using the confidences for both foreground and background proposals and proposals that do not meet a predetermined threshold or condition are discarded. The inference operation continues with classifier 40 and bounding box regressor 42 being run on each of the remaining proposals for which the feature maps are extracted through ROI pooling 28. The resulting confidences and bounding boxes can be called "detections". Another NMS is run, at NMS 44, to filter the detections. At NMS 44, the detections that are classified as background and the detections having confidences below a configurable threshold are discarded as well as detections that have an IoU that is above a configurable threshold. The final resulting output of object detector 20 for an image includes object classifications labeled "CLASS", and coordinates for the bounding box of each detected object labeled "BOUNDING BOX COORDINATES." In addition, the method provides an indication if a proposal of interest is discarded and why the proposal of interest was discarded. Reasons why a proposal is discarded may include the step at which the proposal was discarded and/or reasons why a criterion for retention of the proposal was not satisfied. The reasons may also include examples of proposals that are similar to the discarded proposal but were not discarded. The method will also indicate detections that overlap during one of NMS 38 or NMS 44.

During NMS 38, the proposal of interest (e.g., bounding box 34 around the traffic light) may be discarded by object detector 20. In this case, if discarded, the model designer will be informed the reason bounding box 34 was discarded. For example, a proposal may be discarded because a confidence value is below a threshold confidence value. In the disclosed method, the user can choose to exempt bounding box 34 from being discarded by the filtering process. One way to achieve this exemption is to replace one of the other proposals that pass through the NMS with the user drawn bounding box. By exempting the user drawn bounding box from being discarded, the user may learn whether the proposal would still be one of the output detections if one intermediate step in the system had not discarded it.

In another embodiment where object detector 20 does not feature a RPN, e.g., a YOLO object detector, the method may be applied to detections before any NMS step in the object detector. For one-stage object detectors such as YOLO, the method can be applied by finding the detection in the output of a neural network component encountered before an NMS is run to determine a bounding box having the highest IoU with a user drawn bounding box. Information about this detection can be displayed and the detection can be exempted from being discarded by any NMS steps if desired.

Figure 3:
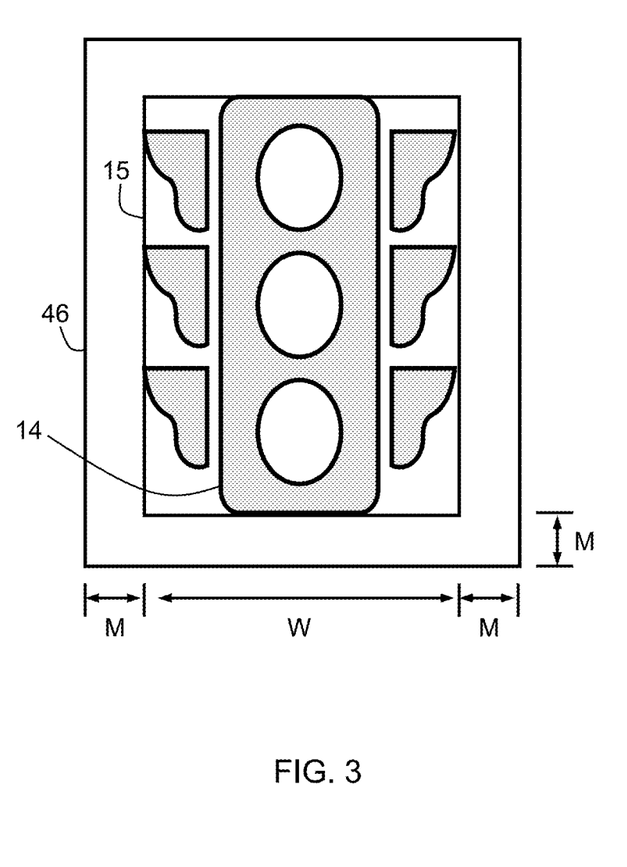
FIG. 3 illustrates a user constructed bounding box with margin in accordance with an embodiment.

FIG. 3 illustrates a user constructed bounding box with margin in accordance with an embodiment. To manually construct a bounding box, an object is selected from an image. As an example, the selected object is traffic light 14 from FIG. 1. A bounding box is drawn around the image that closely follows an outline of the object, such as bounding box 15. A bounding box is typically rectangular shaped but can be a different shape in other embodiments. Bounding box 15 is isolated from the rest of the image by either cropping the bounding box from the image or by masking an area outside of the bounding box with a solid color. Width W is the width of bounding box 15. The area of bounding box 15 is then increased by a margin width M resulting in bounding box 46. In one embodiment, the margin M has the same width all the way around object 14. In one embodiment, margin M is chosen to be 0.2 times the width W of bounding box 15 for all four sides, or edges of bounding box 15. In another embodiment, the margins may be a different width on the sides than on the top and bottom of the bounding box. Also, the margins may be different for each of the sides.

An inference operation is then run on bounding box 46 with the object detector that is to be analyzed, such as object detector 20 in FIG. 2. The added margin adds context to the object. Alternatively, the object can be cropped multiple times and margin M can be increased to different values for each of the cropped objects. The resulting object with bounding box becomes the image to be run in the object detector and analyzed. The inference operation may be run separately on each of the different sized bounding boxes. In another embodiment, instead of cropping the object, the areas of the image outside of the bounding box may be masked. In one embodiment, the masking may be done with a solid color. Note that any preprocessing steps of the object detector may upscale the cropped image to meet the required input dimensions. Choosing a masking approach instead of a cropping approach makes it easier to scale the image to meet the input dimension requirements. If the bounding box with margin causes the bounding box to cross an edge or side of the images, the bounding box may be clipped at the edge or padded with a solid color. An interpretability tool such as a gradient class activation map (Grad-CAM) can be used to visualize the attention area of the object detector for the detected traffic light of the crop of the original image. By applying the method to the cropped object using different sized margins M, it may be learned at what scale the cropped object is detected correctly and if the detection failure of the original image is due to a misunderstanding about what a traffic light looks like or if the traffic light was too small in the image for the object detector to recognize. To analyze the results of multiple inference operations on the multiple bounding boxes with different margins, the results of the inference operations may be aggregated to determine how many times and for which bounding boxes the object detector correctly identified the object. Also, differences between the results of the inference operation with the different margins may be compared.

Occasionally, an object detector may incorrectly detect an object that is not in the image, such as phantom object 36 in FIG. 2. For example, assume a portion of a tree trunk in an image is incorrectly classified as a cow, where a softmax function class score of the output detector for the cow is relatively high. Using the disclosed method may help provide a confidence metric that is better at dealing with phantom objects.

To compute a confidence metric, multiple crops of the phantom object are created with variable margins having different sizes as discussed above. For the multiple crops, the multiple margins M are changed with a variable interval where, e.g., the margins M equal to $0.2 \times 2^n$ where n is an integer. In another embodiment, the multiple margins M may be calculated differently. A number of inference operations is then run as discussed above in the discussion of FIG. 2, where one inference operation is run for each of the cropped images. An IoU for each detection is computed for the phantom object. The confidences of the output class of the incorrect classification is recorded for each of the plurality of bounding boxes. A new confidence metric can be derived using the recorded confidences.

An advantage of this method of determining confidences instead of using, e.g., gradients in the ML model, is that the method only requires the use of inference operations. Also, the object detector does not need to be retrained or modified. Therefore, no additional circuitry or logic is required for computing the confidence metric. Also, the number of crops that are computed can be adjusted to make the computation of the confidence metric less time consuming. In addition, to further reduce the time required for computation, only the additional confidence metrics for detections that have a ML model output confidence below a certain threshold are computed.

Figure 4:
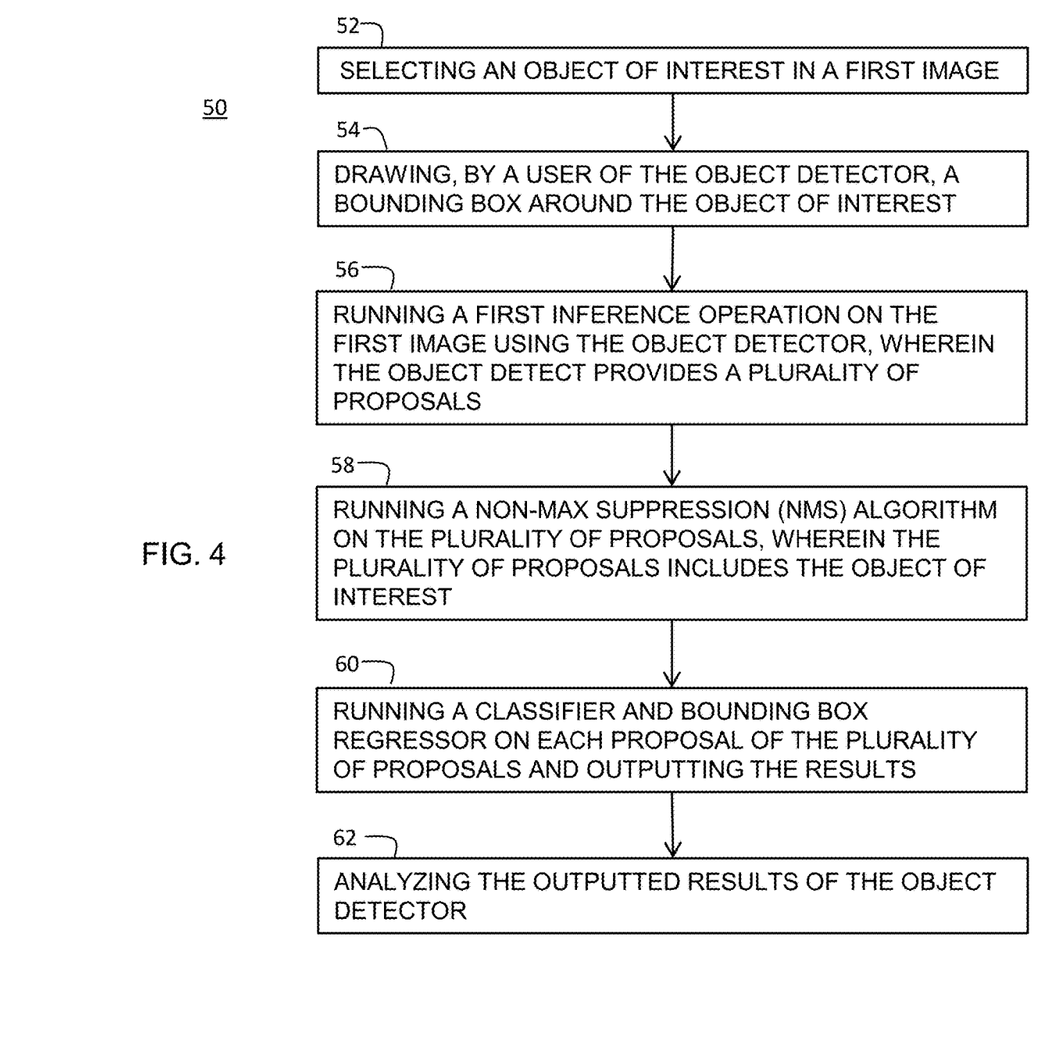
FIG. 4 illustrates a method for analyzing an output of an object detector in accordance with an embodiment.

FIG. 4 illustrates method 50 for analyzing an output of an object detector for a selected object of interest in an image in accordance with an embodiment. Method 50 begins at step 52. At step 52, an object of interest is selected in a first image. The object of interest may be, e.g., an object that was misidentified by the object detector. At step 54, a bounding box is drawn around the object of interest by a user. The user may be, e.g., a ML model designer. The bounding box may be drawn with a margin as shown in FIG. 3. Also, multiple bounding boxes may be drawn with different margins and each of the drawn bounding boxes with margins may be isolated from the image to create multiple images. At step 56, a first inference operation is run on the first image using the object detector, wherein the object detector provides a plurality of proposals. Each of the proposals may include coordinates of bounding boxes provided by the object detector and confidences regarding the predicted accuracy of the proposals. In the case where multiple bounding boxes were drawn to create multiple images, a separate inference operation is run on each of the created images. At step 58, a non-max suppression algorithm is run on the plurality of proposals. The plurality of proposals includes the object of interest in the user drawn bounding box. At step 60, a classifier and a bounding box regressor is run on each proposal of the plurality of proposals and the results are output by the object detector. At step 62, the outputted results are analyzed. The results may be analyzed in different ways depending on what is desired to be learned from the outputted results as discussed above.

Figure 5:
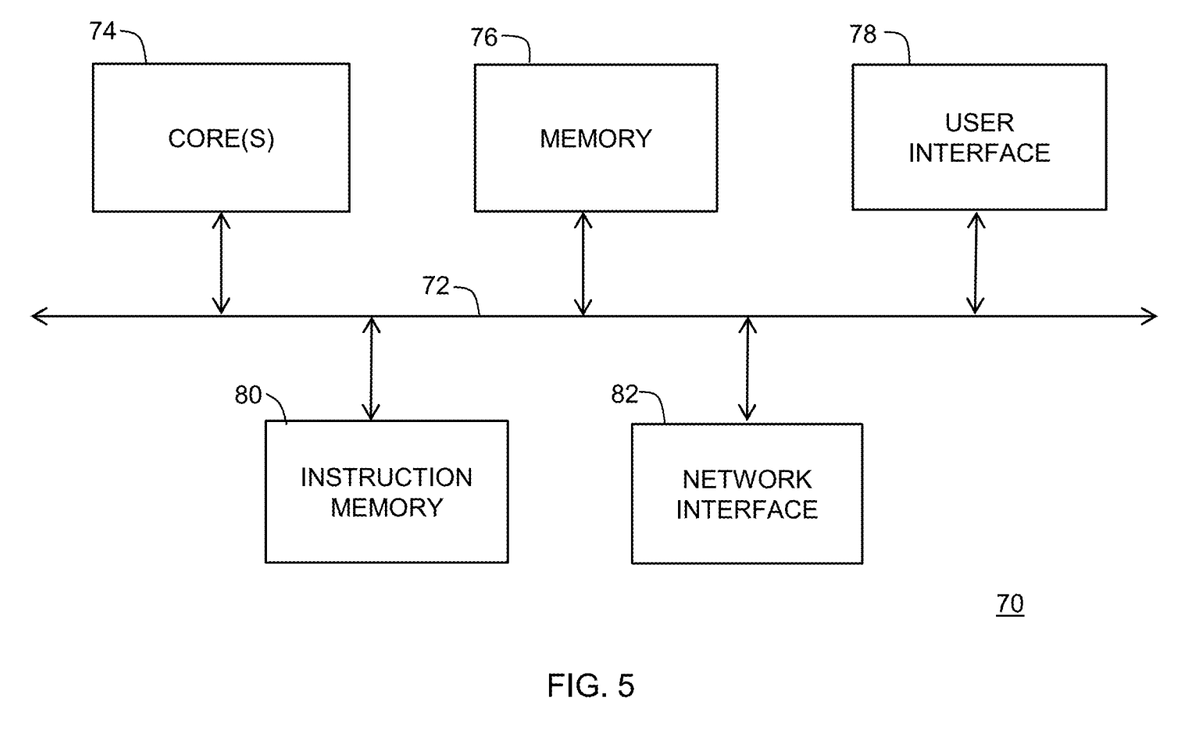
FIG. 5 illustrates a data processing system suitable for implementing the method of FIG. 4.

FIG. 5 illustrates a data processing system 70 suitable for implementing the method of FIG. 4. Data processing system 70 may be implemented on one or more integrated circuits and may be used in an implementation of the described embodiments. Data processing system 70 includes bus 72. Connected to bus 72 is one or more processor cores 74, memory 76, user interface 78, instruction memory 80, and network interface 82. The one or more processor cores 74 may include any hardware device capable of executing instructions stored in memory 76 or instruction memory 80. For example, processor cores 74 may execute the machine learning algorithms used for training and operating the ML model used in the object detector. Processor cores 74 may be, for example, a microprocessor, field programmable gate array (FPGA), application-specific integrated circuit (ASIC), or similar device. Processor cores 74 may be implemented in a secure hardware element and may be tamper resistant.

Memory 76 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 76 may be implemented in a secure hardware element. Alternately, memory 76 may be a hard drive implemented externally to data processing system 70. In one embodiment, memory 76 is used to store software or data required for running the object detector and method for analyzing output data from the object detector.

User interface 78 may be connected to one or more devices for enabling communication with a user such as an administrator. For example, user interface 78 may be enabled for coupling to a display, a mouse, a keyboard, or other input/output device. Network interface 82 may include one or more devices for enabling communication with other hardware devices. For example, network interface 82 may include, or be coupled to, a network interface card (NIC) configured to communicate according to the Ethernet protocol. Also, network interface 82 may implement a TCP/IP stack for communication according to the TCP/IP protocols. Data samples for classification may be input via network interface 82, or similar interface. Various other hardware or configurations for communicating are available.

Instruction memory 80 may include one or more machine-readable non-transient storage media for storing instructions for execution by processor cores 74. In other embodiments, both memories 76 and 80 may store data upon which processor cores 74 may operate. Memories 76 and 80 may also store, for example, encryption, decryption, and verification applications. Memories 76 and 80 may be implemented in a secure hardware element and may be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for analyzing an output of an object detector for a selected object of interest, the method comprising:
    selecting the object of interest in a first image;
    drawing, by a user of the object detector, a bounding box around the object of interest;
    running a first inference operation on the first image using the object detector, wherein the object detector generates a plurality of proposals as part of the first inference operation;
    determining which of the plurality of proposals is most like the bounding box around the object of interest;
    running a non-max suppression (NMS) algorithm on the plurality of proposals, wherein the plurality of proposals includes the object of interest;
    running a classifier and bounding box regressor on each proposal of the plurality of proposals and outputting the results; and
    analyzing the outputted results of the object detector.

2. The method of claim 1, wherein the object detector comprises a convolutional neural network having a plurality of layers, wherein the method further comprises:

changing a margin of the bounding box;
running a second inference operation after changing the margin of the bounding box;
outputting results from an intermediate layer of the plurality of layers; and
comparing differences between the outputted results of the first inference operation and an outputted result after the second inference operation.

3. The method of claim 1, wherein drawing a bounding box around the object of interest further comprises:
drawing the bounding box having a configurable margin, wherein the bounding box is larger than the object;
masking all an area outside of the bounding box in the first image to create a second image;
running a second inference operation on the second image; and
analyzing outputted results from the second inference operation.

4. The method of claim 1, wherein drawing a bounding box around the object of interest further comprises:
drawing the bounding box around the object of interest having a configurable margin;
cropping the bounding box with the configurable margin from the first image to create a second image;
running a second inference operation on the second image; and
analyzing outputted results from the first and second inference operations.

5. The method of claim 1, further comprising:
drawing a plurality of bounding boxes around the object of interest, each bounding box of the plurality of bounding boxes having a different sized margin;
cropping each bounding box comprising the object of interest with the different sized margins to create multiple bounding boxes;
running an additional inference operation for each bounding box of the plurality of bounding boxes to generate one or more detections;
computing an intersection over union (IoU) for each of the one or more detections;
recording an output class confidence for the one or more detections; and
using the recorded output class confidences to derive a confidence metric for the object of interest.

6. The method of claim 1, wherein drawing the bounding box having a configurable margin further comprises drawing a plurality of bounding boxes around the object of interest, each bounding box of the plurality of bounding boxes having a different sized margin, wherein the margins for the plurality of bounding boxes is equal to $0.2 \times 2^n$ where n is an integer.

7. The method of claim 5, wherein analyzing the outputted results from the additional inference operations further comprises:
aggregating the outputted results; and
determining how many times the object of interest was correctly identified.

8. The method of claim 1, wherein the object detector comprises one of either a one-stage object detector or a two-stage object detector.

9. The method of claim 1, further comprising preventing the NMS algorithm from discarding a proposal of the plurality of proposals that includes the object of interest.

10. A method for analyzing an output of an object detector for a selected object of interest, the method comprising:
selecting the object of interest in a first image;
adding the bounded object to a plurality of proposals;
running a first inference operation on the first image;
running a non-max suppression (NMS) algorithm on the plurality of proposals, wherein the plurality of proposals includes the bounded object;
preventing the NMS algorithm from discarding a proposal of the plurality of proposals that includes the object of interest;
running a classifier and bounding box regressor on each proposal of the plurality of proposals and outputting the results; and
analyzing the outputted results of the object detector.

11. The method of claim 10, wherein the object detector comprises a convolutional neural network having a plurality of layers, wherein the method further comprises:
changing a margin of the bounding box;
running a second inference operation after changing a margin of the bounding box;
outputting results from an intermediate layer of the; and
comparing differences between the outputted results of the first inference operation and an outputted result after the second inference operation.

12. The method of claim 10, wherein drawing a bounding box around the object of interest further comprises:
drawing the bounding box having a configurable margin, wherein the bounding box is larger than the object;
masking all of an area outside of the bounding box in the first image to create a second image;
running a second inference operation on the second image; and
analyzing outputted results from the second inference operation.

13. The method of claim 10, wherein drawing a bounding box around the object of interest further comprises:
drawing the bounding box having a configurable margin, wherein the bounding box is larger than the object;
cropping the bounding box from the first image to create a second image;
running a second inference operation on the second image; and
analyzing outputted results from the second inference operation.

14. The method of claim 13, further comprising:
drawing a plurality of bounding boxes around the object of interest, each bounding box of the plurality of bounding boxes having a different sized margin;
cropping each bounding box with the different sized margins;
running an additional inference operation for each cropped bounding box of the plurality of bounding boxes to generate one or more detections; and
computing an intersection over union (IoU) for each of the one or more detections;
recording an output class confidence for the one or more detections; and
using the recorded output class confidences to derive a confidence metric for the object of interest.

15. The method of claim 10, wherein drawing the bounding box having a configurable margin further comprises drawing a plurality of bounding boxes around the object of interest, each bounding box of the plurality of bounding boxes having a different sized margin, wherein the margins for the plurality of bounding boxes is equal to $0.2 \times 2^n$ where n is an integers.

16. The method of claim 14, wherein analyzing the outputted results from the additional inference operations further comprises:
   aggregating the outputted results; and
   determining how many times the object of interest was correctly identified.

17. The method of claim 10, wherein the object detector comprises one of either a one-stage object detector or a two-stage object detector.

18. A method for analyzing an output of an object detector for a selected object of interest, the method comprising:
   selecting the object of interest in a first image;
   drawing, by the user, a plurality of bounding boxes around the object of interest, each bounding box of the plurality of bounding boxes having a different sized margin;
   isolating each bounding box with the different sized margins from the rest of the image;
   running an inference operation for each isolated bounding box of the plurality of bounding boxes, wherein the object detector provides a plurality of proposals for each inference operation;
   running a non-max suppression (NMS) algorithm on the plurality of proposals;
   running a classifier and bounding box regressor on each proposal of the plurality of proposals and outputting the results; and
   analyzing the outputted results of the object detector.

19. The method of claim 18, wherein the margins for the plurality of bounding boxes is equal to $0.2 \times 2^n$ where n is an integer.

20. The method of claim 18, wherein isolating each bounding box with the different sized margins from the rest of the image further comprises either cropping each bounding box from the image or masking all of an area outside of the bounding box.

* * * * *